May 22, 1951      O. K. COLEMAN ET AL      2,554,456
ELECTROLYSIS RESISTING CONDUIT HUB
Filed Jan. 15, 1948
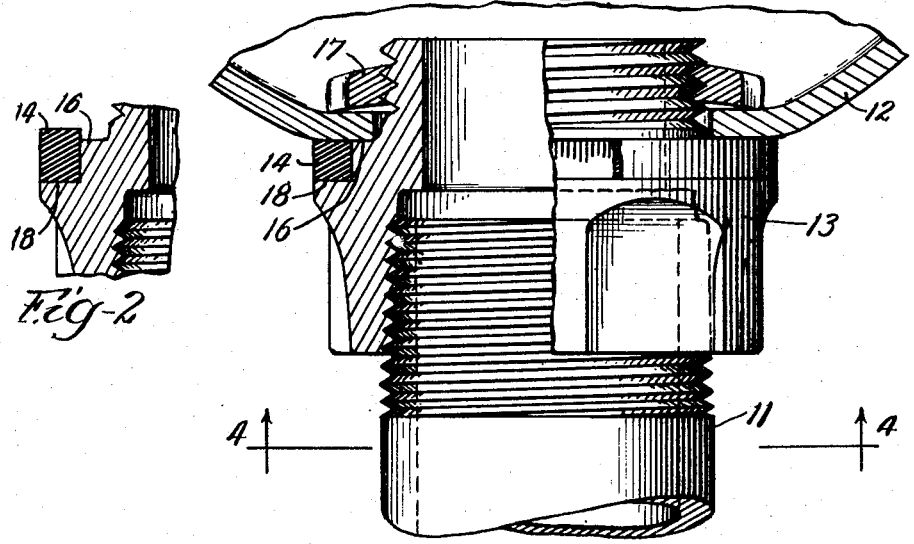
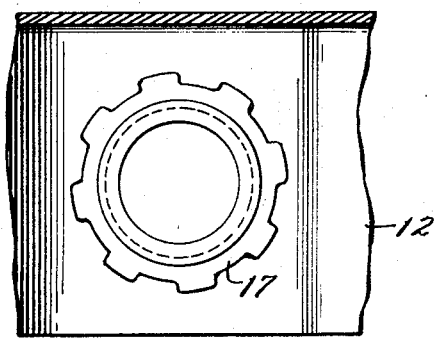
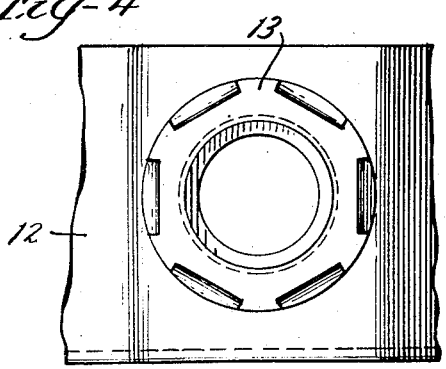
Inventors.
Orville K. Coleman &
Richard A. Road.
By:- Louis Robertson    Atty Patented May 22, 1951

2,554,456

UNITED STATES PATENT OFFICE 2,554,456

ELECTROLYSIS RESISTING CONDUIT HUB

Orville K. Coleman and Richard A. Road, West Lafayette, Ind., assignors to Duncan Electric Manufacturing Company, La Fayette, Ind., a corporation of Illinois Application January 15, 1948, Serial No. 2,526

4 Claims. (Cl. 285—6.5)

1

According to a common and approved practice, electric wiring is protected by pipes commonly called conduit. Such conduit may run, for example, from the meter housing throughout the house or building, and wires are fed through such conduit to the various switches, lamps and outlets. It is desirable, and in fact required by code, that such conduit be grounded. This is important because otherwise there would be danger that an ungrounded wire within the conduit would make contact with the conduit with the result that someone might be electrocuted by touching the conduit, particularly if the person were standing on a damp floor or touching something which in turn was grounded. Codes also require that the meter housing be grounded as by being in firm contact with the conduit.

Now that meters are commonly being located out of doors, a problem of corrosion has developed. This corrosion has been especially severe at the junction of the conduit and the meter case. According to the present invention this corrosion is largely eliminated by providing a seal which prevents the same drop of water from contacting both the meter case and the conduit hub. This substantially eliminates electrolytic currents which caused most of the corrosion. The seal also has the advantage of giving better protection to the meter mechanism within the case. The seal has been worked out in such a way that it does not interfere with the important electrical grounding connection between the meter case and the conduit.

Additional objects and advantages will become apparent from the following description, and from the drawings, in which:

Figure 1 is a fragmentary view, partly in section, showing the preferred form of the invention chosen for illustration, an assembly of the hub, a meter case and conduit being shown.

Fig. 2 is a fragmentary sectional view showing the relationship of the hub and the sealing gasket before assembly thereof to the meter case.

Fig. 3 is a fragmentary view looking down on the hub in Fig. 1.

Fig. 4 is a fragmentary sectional view taken approximately on the line 4—4 of Fig. 1 and showing a bottom view of the hub.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

In the illustrated form of the invention a conduit 11 is connected to a meter casing 12 by a hub 13. The casing 12 may be formed of conventional cast aluminum or it may be drawn from sheet aluminum. The conduit 11 is conventionally formed of steel tubing.

When two metals having substantially different electrochemical potentials, for example aluminum and steel, are brought together in an exposed location, water will collect on the exposed surfaces and localized electrolytic currents will be set up. These currents cause relatively rapid corrosion. (Reference to different electrochemical potentials is more technically referred to as being differently positioned in the electrochemical series.)

According to the present invention this corrosion is substantially prevented by providing a sealing gasket 14 between the conduit hub and the housing. This breaks up the electrolytic currents because water will not ordinarily span across the gasket 14 from the casing 12 to the hub 13. When a thin sheet of water does occasionally span across the gasket, the distance involved is large enough so that the minute electrolytic voltages are not able to cause much current flow and hence there is little corrosion.

The hub 13 is preferably formed of iron so that there will be little or no electrolytic action between it and the conduit 11. More specifically, the hub may be a cast iron hub. If cast iron hubs 13 are not available, a washer may be positioned against the lower end of hub 13 to seal it from conduit 11. Such a washer may be sealed firmly against the bottom of hub 13 by a nut threaded on conduit 11.

It is important to have a firm, dependable, electrical contact between casing 12 and conduit 11. A good electrical contact between conduit 11 and hub 13 is ensured by providing a pipe joint between these two parts. Thus the threads on the two parts are tapered and the hub 13 is screwed onto the pipe 11 until the taper produces a tight joint.

The firm and dependable electrical connection between the hub 13 and casing 12 is accomplished by providing a shoulder 16 which is preferably an annular shoulder just inside the gasket 14. The shoulder 16 bears against casing 12, being drawn tightly thereagainst by nut 17 which is the usual type of nut employed for conduit hubs.

As seen in Fig. 2, the natural thickness of the washer 14 is slightly greater than the height of the shoulder 16 above the outer shoulder 18. As a result, the gasket 14 is compressed as the shoulder 16 is tightened against the casing 12. Hence the gasket 14 remains under resilient compression to ensure an effective seal so that there is no danger that moisture will seep to the junction between shoulder 16 and casing 12.

The hub 13 may be given any suitable external shape desired. That shown is desirable because it combines the features of strength, conservation of metal, and ease of engaging with a tool to tighten onto conduit 11.

From the foregoing it is seen that a connection has been provided between conduit and a meter casing in which there is a firm, dependable, all-metal connection for grounding purposes and in which corrosion is nevertheless minimized by providing a sealing gasket between the outer surface of the casing formed of one metal and the outer surface of the conduit structure or hub formed of another metal.

Although dimensions may be varied considerably, it is preferred that the outside of hub 13 be spaced at least $\frac{1}{16}$ inch and preferably $\frac{3}{32}$ inch from the casing 12, so that standing droplets will rarely span between them. The shoulder 16 therefore projects $\frac{3}{32}$ inch beyond the highest part of outer shoulder 18. The latter is preferably slightly higher at its periphery than inwardly thereof, sloping inwardly to confine the gasket. The gasket should be at least $\frac{3}{32}$ inch higher than shoulder 16 to be considerably compressed before it strikes casing 12. The gasket 14 is preferably formed of vulcanized rubber, either natural or synthetic. It may be any other weather-resistant resilient material substantially impervious to water.

We claim:

1. The combination of a casing for an electrical device and a conductor-housing conduit including a metallic casing, a metallic conduit hub extending through an opening in the casing and having an inner shoulder bearing on the outside of the casing to form a grounding connection, and an outer annular shoulder therearound spaced from and facing the casing, an impervious resilient gasket of insulating material squeezed between the casing and said outer annular shoulder and sealing the first-named shoulder from the surrounding atmosphere, a threaded nut engaging the hub and the casing internally of the casing and drawing the inner shoulder firmly against the casing, and a metallic conduit firmly threaded into the hub externally of the casing, said hub and conduit being of like metal and said casing being of a substantially different metal such that with a common electrolytic path between the casing and the conduit and hub corrosion would result.

2. A metallic conduit hub having a hub body threaded internally from one end, a threaded nipple extending from the other end and adapted to extend through an opening in a casing, said hub body having an inner shoulder adjacent the nipple adapted to bear on the casing to form a grounding connection, and an outer annular shoulder therearound set back from the inner shoulder to be spaced from the casing and adapted to receive an impervious resilient gasket of insulating material to bear on the outside of the casing to seal the inner shoulder from the surrounding atmosphere.

3. The combination of a casing for an electrical device and a conductor-housing conduit including a metallic casing, a metallic conduit hub extending through an opening in the casing and having an inner shoulder bearing on the outside of the casing to form a grounding connection, and an outer annular shoulder therearound spaced from and facing the casing, an impervious resilient gasket of insulating material squeezed between the casing and said outer annular shoulder and sealing the first-named shoulder from the surrounding atmosphere, a threaded nut engaging the hub and the casing internally of the casing and drawing the inner shoulder firmly against the casing, and a metallic conduit firmly secured in the hub in direct contact therewith externally of the casing, said hub and conduit being of like metal and said casing being of a substantially different metal such that with a common electrolytic path between the casing and the conduit and hub corrosion would result.

4. A metallic conduit hub having a hub body provided at one end with means to receive and firmly engage a metallic conduit in direct metal to metal contact, a threaded nipple extending from the other end of the hub body and adapted to extend through an opening in a casing, said hub body having an inner shoulder adjacent the nipple adapted to bear on the casing to form a grounding connection, and an outer annular shoulder therearound set back from the inner shoulder to be spaced from the casing and adapted to receive an impervious resilient gasket of insulating material to bear on the outside of the casing to seal the inner shoulder from the surrounding atmosphere.

ORVILLE K. COLEMAN.
RICHARD A. ROAD.

REFERENCES CITED

The following references are of record in the file of this patent:

UNITED STATES PATENTS

| Number | Name | Date |
| --- | --- | --- |
| 137,702 | Matthews | Apr. 8, 1873 |
| 607,316 | Winters | July 12, 1898 |
| 673,656 | Krantz | May 7, 1901 |
| 1,275,439 | Johnson | Aug. 13, 1918 |
| 2,055,130 | Hotchkin | Sept. 22, 1936 |